Dec. 31, 1935.     E. POLACKOFF     2,025,892

TELESCOPIC BIFOCAL LENS

Filed Oct. 10, 1935

INVENTOR.

EDWARD POLACKOFF

BY

John J. Lynch

ATTORNEY.

Patented Dec. 31, 1935

2,025,892

UNITED STATES PATENT OFFICE 2,025,892

TELESCOPIC BIFOCAL LENS

Edward Polackoff, Bronx, N. Y., assignor, by direct and mesne assignments, to The Univis Lens Company, Dayton, Ohio, a corporation of Ohio Application October 10, 1933, Serial No. 692,941

10 Claims. (Cl. 88—54)

This invention relates to bifocal lenses as employed in eye-glass constructions.

A particular object of my invention is to provide in connection with the regular eye-glass lens, other smaller lenses which are seated in the opposite faces of the main lens and in alignment so that the retinal image is increased in size when the glasses are employed by people whose eyes have subnormal near vision after correction of the eyes with regular lenses.

This arrangement provides for lenses which can be used for all purposes without adjustment by the wearer.

A still further object of my invention is to provide a telescopic bifocal lens composed of two flint segments either ground or cemented on opposite sides of a crown lens, the distance correction being ground into the crown lens and the reading vision derived through the use of the two flint lenses embedded or cemented to the crown lens. The flint segment on the anterior surface of the crown lens is of convex power, and the flint segment on the posterior side of the crown lens is of concave power.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
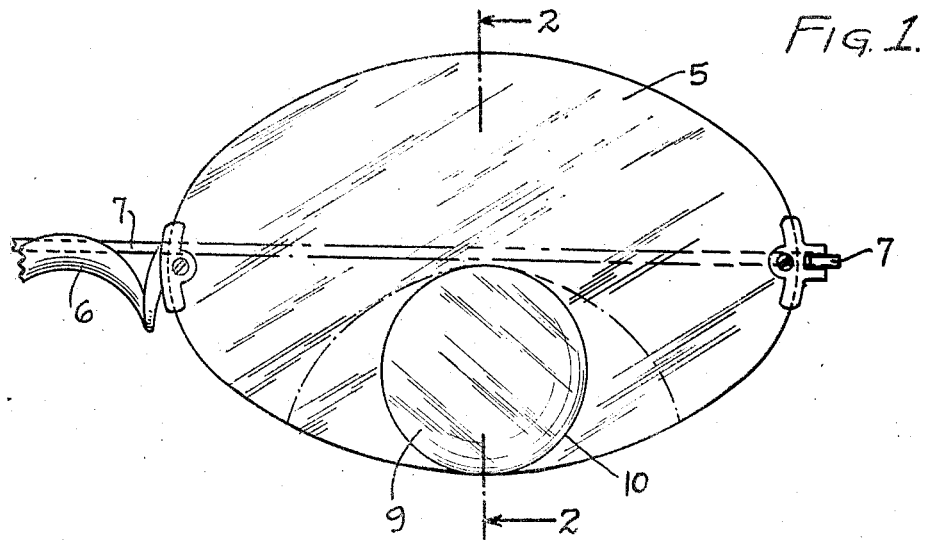
Figure 1 is a view in front elevation of a single eye-glass lens in which is incorporated the telescopic bifocal lens arrangement that forms my invention.

Referring to the drawing in detail, 5 indicates one of the main or major lenses of an eye-glass construction, which lenses, as is well known, are secured together by a suitable bridge portion, 6, and may be provided with the temple 7, for holding the eye-glasses in position on the nose of the wearer.

Figure 2:
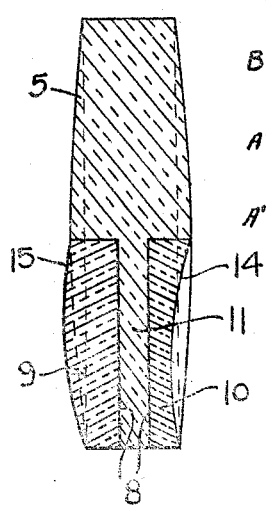
Figure 2 is a section taken on the line 2—2 of Figure 1, illustrating the method employed in seating the two minor lenses in the main lens to provide the telescopic effect desired.

It is the purpose of my invention to use a telescopic bifocal lens in connection with the regular lens used by people whose eyes have subnormal vision, which may be corrected with the regular lenses, and the object of my invention is to increase the size of the retinal image for use by people whose eyes have subnormal near vision after being corrected with regular lenses. This arrangement provides for lenses which can be used for all purposes without adjustment by the wearer. And in carrying out my invention, the main or crown lens, 5, is ground to provide the seats, 8, in the opposite side of the lower portion thereof. These seats, 8, are arranged to receive the minor lenses or flint segments, 9 and 10, respectively, the lens, 9, being of convex power, and being positioned on the anterior surface of the main lens, it being evident, as illustrated, that the anterior surface of the lens, 9, is of convex power. The inner lens, 10, or the one on the posterior surface or side of the main lens, is of concave power, and as illustrated in Figure 2 its posterior side is of concave power, so that in the whole lens combination there is provided the main lens, 5, and the two minor lenses, 9 and 10, which are separated from each other by the thickness of the reduced portion of the main lens, 5.

It is understood that the lenses, 9 and 10, could be placed back to back and ground into the main lens, 5, without leaving any of the lens, 5, between said lenses 9 and 10, although the illustrated construction is the preferred one.

It is to be understood also that the flint segments or minor lenses, 9 and 10, are either ground or cemented on the opposite sides of the crown lens, 5, the distance correction being ground into the crown lens, and the reading vision is derived through the use of the two flint or minor lenses, 9 and 10, embedded or cemented in the crown lens.

Figure 3:
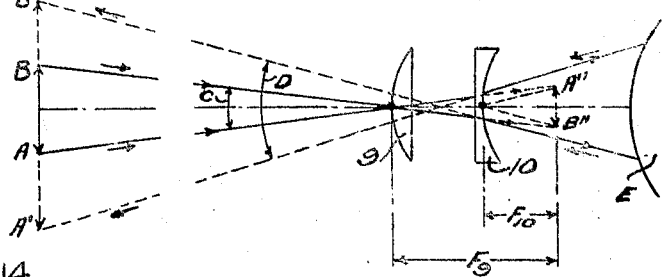
Figure 3 is a schematic view of the telescopic bifocal lens according to the invention.

Referring to Fig. 3, minor lenses 9 and 10 are so spaced apart that their focal planes coincide. The distance designated $F_9$ is the focal length of the convex lens 9. The focal length of the concaved lens 10 is the distance represented by $F_{10}$. The object to be magnified is designated BA and is generally located at a distant point or stated in another way, a distance from the convex lens many times the focal length thereof. The angle of the rays that the object subtends is designated C. These rays are transmitted to the convex lens and would form an image A″ B″ if the concave lens 10 were not a part of the system. The rays transmitted through positive lens 9 however reach the concaved lens and are slightly deflected thereby after which they travel into the eye E. Consequently the line of sight or the image that the eye sees is along the deflected rays emanating from the concaved lens. Hence object BA would be seen as a vertical and enlarged image B' A'. It follows therefore that the angle D, that image subtends is greater than the angle C subtended by its object and hence the image of the object is magnified and the extent of the magnification is dependent upon a ratio of the focal lengths of the minor lenses or expressed mathematically is $$\frac{F_9}{F_{10}} = \frac{\text{Angle } D}{\text{Angle } C} > 1.$$

It is evident, therefore, that I have provided the means of increasing the size of the retinal image which may be used by people whose eyes have subnormal near vision after being corrected with regular lenses, and a pair of glasses which provides for lenses which can be used for all purposes, without adjustment by the wearer. I am aware that telescopic spectacles of one kind or another have been employed, but these are cumbersome and require adjustment, and at the same time do not give the vision correction that is necessary in suiting the telescopic lenses to all eyes. I have provided the telescopic effect without losing advantage of the correction effect of the regular lenses, and the telescopic effect is more pronounced because the eye has been accommodated by the use of the main lens, 5, which has been ground to suit the individual wearer.

While I have illustrated and described my invention with some degree of particularity, I realize that in practice various alterations therein may be made without departing from the spirit of the invention or the scope of the appended claims.

What I claim is:

1. A telescopic bifocal lens comprising a major lens ground for vision adjustment and minor lenses of collecting and diverging powers seated in opposite faces of said major lens in axial alinement with each other, and each having an index of refraction higher than said major lens and having their focal planes coinciding in back of the posterior face of said major lens, the relative space between and powers of said minor lenses being such that a telescopic vision effect is produced.

2. A telescopic bifocal lens comprising a major lens of a given index of refraction ground for vision adjustment and two minor lenses each of a higher index of refraction than the index of refraction of said major lens seated in opposite faces of said major lens in axial alinement with each other, the minor lens on the anterior surface of the major lens being of positive power and the minor lens on the posterior side of the major lens being of negative power, the relative space between and the powers of said minor lenses being such that a telescopic vision effect is produced.

3. The combination with a main eyeglass lens which has been ground for vision correction, of a plurality of lenses comprising a positive and negative lens each having an index of refraction higher than said main lens and having their focal planes substantially coinciding in back of the posterior face of said main lens seated in opposite faces of said main lens and in axial alinement with each other to provide a telescopic reading effect.

4. The combination with a crown main eyeglass lens which has been ground for vision correction, of a plurality of flint segments constituting opposing lenses comprising a positive and negative lens of a higher index of refraction than said main lens and having their focal planes substantially coinciding in back of the posterior face of said main lens and secured to opposite faces of said main lens and in axial alinement with each other to provide a telescopic reading effect.

5. A telescopic bifocal lens comprising a major lens ground for vision adjustment and minor lenses seated in opposite faces of said major lens and in axial alinement, the minor lens on the anterior surface of the major lens being of positive power, and the minor lens on the posterior surface being of negative power, the index of refraction of said minor lenses being higher than the index of refraction of said major lens and having their focal planes substantially coinciding in back of the posterior face of said major lens, the powers of said minor lenses being such that a telescopic effect is produced.

6. In a telescopic bifocal lens, the combination of, a major crown glass lens ground for vision adjustment, positive and negative minor lens means each of flint glass disposed in opposite faces of said major lens and in axial alinement, said opposing minor lens means being spatially arranged with their focal planes coinciding and cooperating to produce an image subtending an angle greater than the angle subtended by its object.

7. In a telescopic bifocal lens, the combination of, a major lens ground for vision adjustment, a minor lens of positive power disposed in an anterior portion of said major lens, a minor lens of negative power disposed in a posterior portion of said major lens, said minor lenses being disposed in axial alinement and having their focal lengths coinciding, said minor lenses each having an index of refraction higher than said major lens and cooperating to produce an image subtending an angle greater than the angle subtended by its object.

8. In a telescopic bifocal lens, the combination of, a major lens ground for vision adjustment, a positive power minor lens disposed in an anterior portion of said major lens, a negative power minor lens disposed in a posterior portion of said major lens, said minor lenses being spatially arranged in axial alinement and having their focal lengths coinciding in back of said posterior portion, said minor lenses each having an index of refraction higher than said major lens, said minor lenses cooperating to produce an image subtending in front of said anterior portion an angle greater than the angle subtended by its object.

9. In a telescopic bifocal lens, the combination of, a major lens of crown glass ground for vision adjustment, a minor lens of flint glass and of positive power secured to an anterior portion of said major lens, a minor lens of flint glass and of negative power secured to a posterior portion of said major lens, said minor lenses having their optical centres disposed in horizontal alinement and having their focal planes coinciding in back of said posterior portion, said minor lenses cooperating to produce an image subtending an angle greater than the angle subtended by its object.

10. A telescopic bifocal lens comprising; a major lens of crown glass, ground for vision adjustment and two minor lenses each of flint glass, seated in opposite faces of said major lens and having their optical centres disposed in horizontal axial alinement, the minor lens on the anterior surface of said major lens being of positive power and the minor lens on the posterior side of major lens being of negative power, said minor lenses having their focal planes substantially coinciding at the back of the posterior face of said major lens, the relative powers of said minor lenses being such that a telescopic vision effect is produced.

EDWARD POLACKOFF. [L. S.]